No. 720,937. PATENTED FEB. 17, 1903.
T. LANEY.
DEVICE FOR PREVENTING HORSES KICKING THE STALLS OF STABLES.
APPLICATION FILED SEPT. 27, 1902.
NO MODEL
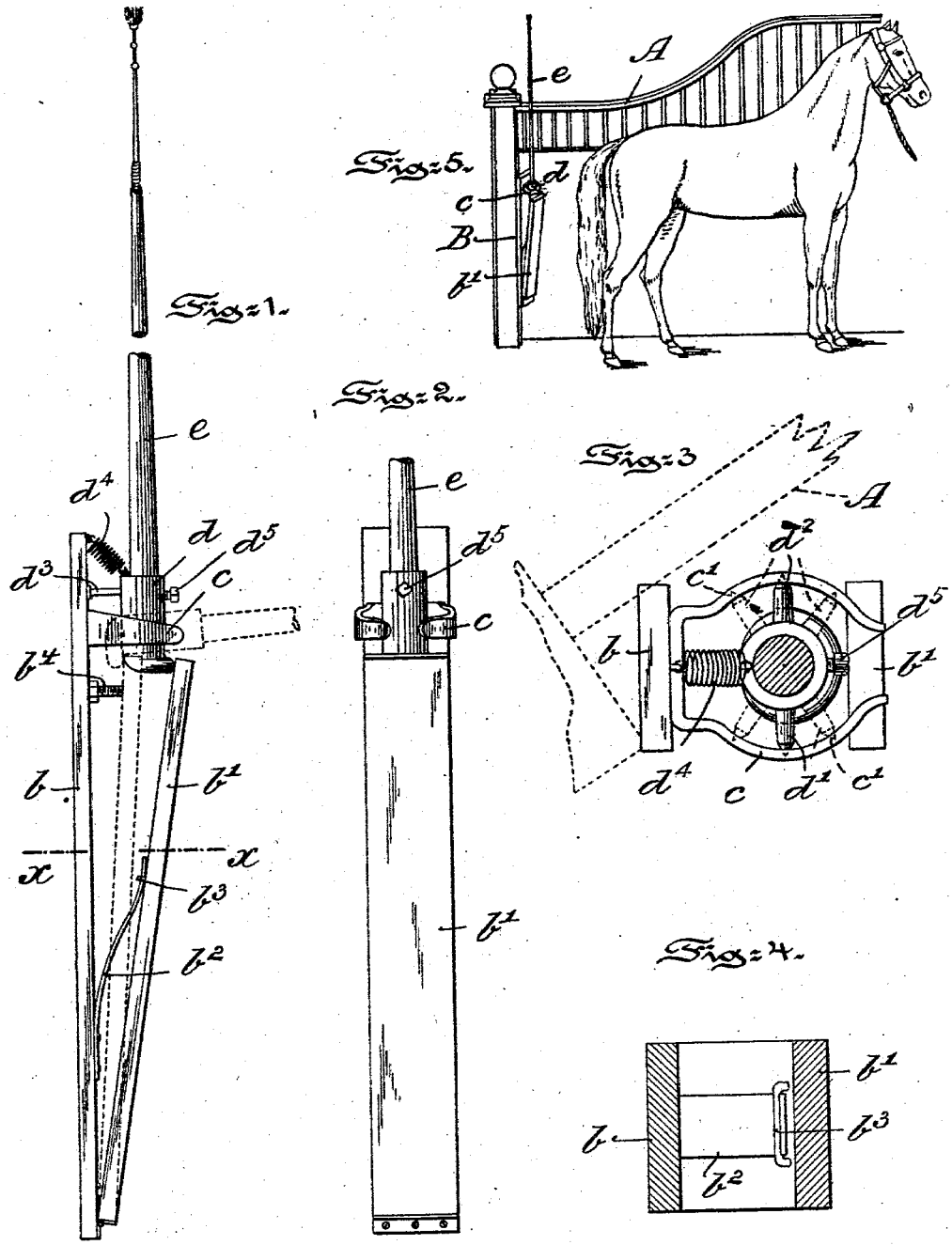

UNITED STATES PATENT OFFICE.

THOMAS LANEY, OF PHILADELPHIA, PENNSYLVANIA.

DEVICE FOR PREVENTING HORSES KICKING THE STALLS OF STABLES.

SPECIFICATION forming part of Letters Patent No. 720,937, dated February 17, 1903.

Application filed September 27, 1902. Serial No. 125,035. (No model.)

*To all whom it may concern:*

Be it known that I, THOMAS LANEY, a citizen of the United States, residing at the city of Philadelphia, in the county of Philadelphia and State of Pennsylvania, have invented certain new and useful Improvements in Devices for Preventing Horses Kicking the Stalls of Stables, of which the following is a specification.

My invention has relation to a device for preventing or breaking horses kicking at the stalls of stables, and in such connection it relates to the general construction and arrangement of such an appliance or device for the said purpose.

The principal object of my present invention is to provide a comparatively simple, durable, and effective device or appliance for preventing or breaking horses in the stalls of stables destroying the same by kicking thereat, which is a quite common habit of most horses so to do on the least provocation or during feeding periods.

My invention, stated in general terms, consists of a device or appliance to prevent or break horses from kicking stalls of stables constructed and arranged in substantially the manner hereinafter described and claimed.

The nature and scope of my present invention will be more fully understood from the following description, taken in connection with the accompanying drawings, forming part hereof, in which—

Figure 1 is a side elevational view of a device or appliance of my invention adapted to be suitably applied to the stall of a stable for use embodying main features of my invention. Fig. 2 is a front view of the spring-controlled strip or board for actuating the tapping or lashing device of the invention by the action of the horse. Fig. 3 is a view, partly in plan and partly in section, of the pivotally-supported socket for the tapping or lashing device spring-controlled as to the return of the same to its normal position. Fig. 4 is a section on the line $x\,x$ of Fig. 1 of the leaf-spring controlling the normal position of the strip or board adapted to be acted upon or against by the hoofs of the horse; and Fig. 5 is a side elevational view of a stall with a horse shown standing therein and with the device or appliance of my invention suitably applied to one corner of the stall and in operative position for being actuated by the action of the animal to cause the tapping or lashing device to be lowered against the body of the animal by kicking at the strip or board of the device, and thereby eventually to break the animal of the stall-kicking habit so destructive to the stalls of stables.

Referring to the drawings, A in Fig. 5 represents the stall of a stable with the animal shown tied therein.

B is the device or appliance of my invention, consisting of a cap-board $b$, provided, as shown in Figs. 1 and 2, with a strip or kicking-board $b'$, hinged at its lower end to the cap-board $b$.

$b^2$ is a leaf-spring secured to the cap-board and the free end bent outward and loosely engaging in a staple $b^3$ of the strip or board $b$, as clearly illustrated in Figs. 1 and 4, and so as to normally hold said strip or kicking-board $b'$ at preferably an acute angle to the plane of the cap-board.

$b^4$ is a back-stop projecting from the upper portion of the cap-board $b$, as shown in Fig. 1, for limiting the range of movement of the strip or kicking-board $b$.

$c$ is a spring-clip, (see Fig. 3,) the jaws of which on the inner surface are indented at $c'$ to engage the pintles or bearing-pins $d'$ and $d^2$ of a socket-holder $d$, as shown in Figs. 1, 2, and 3, so as to permit said holder to freely turn within the spring-clip $c$.

$d^4$ is a coiled spring extending from the socket-holder $d$ to the cap-board $b$.

$d^3$ is a back-stop projecting from the cap-board $b$ and normally engaging the socket-holder $d$ to limit the range of backward movement thereof.

$e$ is a whip, in the present instance the tapping or lashing device, detachably mounted in the socket-holder $d$ and held to place in the same by means of a tightening-screw $d^5$. The up-and-down movement of the lashing or tapping device is effected by the action of the hoofs of the horse against the strip or kicking-board $b'$ to compress the leaf-spring and to cause the socket-holder $d$, carrying the lashing or tapping device, to be reciprocated to lower the whip onto the back of the animal to tap the animal, and which is then returned to the position indicated in Fig. 1 by the coiled spring $d^4$. In order to permit the capboard $b$ being readily adapted for varying conditions of the stall or to tap the animal at different portions of the body, the spring-clip $c$ is arranged internally with a series of indentations $c'$ for quickly adjusting the socket-holder $d$ to such required conditions, for example, as illustrated in dotted outline in Fig. 3. The back-stops $b^4$ and $d^3$ limit the range of rearward movement of the strip or board $b$ and socket-holder $d$ under respectively the tension of the leaf and coil springs $b^2$ and $d^4$.

It will be manifestly obvious that as to details modifications may be made as to the particular arrangement of the parts of the device or appliance of my invention, and hence I do not wish to be understood as limiting myself to the precise details of such device or appliance as illustrated; but,

Having thus described the nature and object of my invention, what I claim as new, and desire to secure by Letters Patent, is—

1. A device of the character described, comprising a springing strip or board, a movable holder provided with a lashing or tapping device, and means for returning said holder to an operative position.

2. A device of the character described, comprising a spring-actuated strip or board, a pivotal socket-holder, a detachable lashing or tapping device connected with said holder, and means for returning said holder to normal position.

3. A device of the character described, comprising a spring-actuated hinged strip or kicking-board, a spring-clip carrying a pivotal socket-holder, a tapping or lashing device connected with said holder and spring means for returning said holder to normal position.

4. A device of the character described, comprising a cap-board, a back-stop therefor, a spring-controlled strip or kicking-board hinged to said cap-board, a pivotal socket-holder carrying a tapping or lashing device, a back-stop adapted to abut against said holder, and means for returning said holder to normal position.

5. A device of the character described, comprising a strip or kicking-board, a holder provided with a tapping or lashing device adapted to be moved back and forth, and means for returning said holder to normal position.

6. A device of the character described, comprising a strip or kicking-board, means for maintaining said strip or board extended in normal position, a holder adapted to be maintained in a normally vertical position, a tapping or lashing device detachably connected with said holder, and means for returning said holder with its tapping or lashing device to normal position.

7. A device of the character described, comprising means adapted to be actuated by the animal for operating a lashing or tapping device, and means for returning said lashing or tapping device to normal position.

In testimony whereof I have hereunto set my signature in the presence of two subscribing witnesses.

THOMAS LANEY.

Witnesses:
J. WALTER DOUGLASS,
THOMAS M. SMITH.